Patented May 22, 1951

2,554,465

UNITED STATES PATENT OFFICE 2,554,465

MUCOUS LIQUEFYING PREPARATION

Alfred Kraus, Twickenham, Middlesex, England

No Drawing. Application July 25, 1949, Serial No. 106,752. In Great Britain February 28, 1944

9 Claims. (Cl. 167—93)

This invention relates to preparations for reducing the viscosity of or for liquefying mucus and is a continuation-in-part of application Serial No. 749,876, filed May 22, 1947.

According to the present invention, a preparation for application to mucus for reducing the viscosity of or for liquefying mucus by a biochemical oxidation process comprises lactic acid and/or one or more of its derivatives which are substrates of lactor dehydrogenase, and fumaric acid and/or one or more of its derivatives which are substrates of succinic dehydrogenase.

The preparation described above can be used for all purposes where mucolysis is required or desirable and may be applied in any form suitable for the particular purpose. For instance such a mucolytic preparation can be incorporated into products used for dental or oral hygiene, such as mouthwashes, mouthwash tablets, mouthwash powders, dentifrices, denture-cleansers or the like. It can be used in these products either alone or together with the usual constituents of such products such as for instance ethereal oils, abrasives, glycerin, mucilages or the like. Also other agents such as disinfectants, antibiotics, neutralising agents, surface active agents, agents that check fermentation or any other agents which serve a useful purpose may be added with the advantage that these agents now can reach the tooth surface proper where their action is mostly needed. Used in the usual dentifrices, mouth washes and the like, these agents hardly ever reach the tooth surface proper, as they do not penetrate the mucous plaques covering the teeth.

Mucolytic preparations as described above can also be made as or incorporated into products for treatment of mucous membranes whenever removal of the mucous layer covering these membranes is desired. Thus the mucolytic preparations can be used in lozenges, tablets, effervescent tablets, ointments, gargles, fruit drops, chewing gums, lemonade or lemonade tablets or lemonade powders and the like or in any other form suitable for the treatment of mucous membranes, for instance as aerosols for inhalation with the help of atomisers or similar apparatus. Such therapeutic agents as disinfectants, antibiotics and antiphlogistic substances usually penetrate only with difficulty the layer of mucous which covers mucous membranes and, therefore, often do not reach the surface proper of the membrane or the bacteria lying there protected by the mucus. For this reason, these agents often have to be applied in high concentrations in which they irritate the tissue. If applied in association with the mucolytic preparations of the invention, these agents more easily reach the membrane surface or the bacteria thereon and, therefore, can be applied in lower concentrations which do not irritate the tissue. Thus antibacterials or other medicaments used for local treatment of mucous membranes may gain considerably in efficacy, if they are used in combination with the mucolytic preparations as described above.

In carrying the present invention into effect, any lactate and any fumarate can be employed which is a substrate for lactic dehydrogenase and succinic dehydrogenase respectively (a property which can be determined by simple preliminary trial), which is non-toxic and which is soluble in water or in saliva. Specific examples are calcium lactate and sodium fumarate respectively.

The present invention is illustrated by the following examples, in which the parts stated are parts by weight.

Example I

An excellent dentifrice in the form of a powder is prepared by admixing 150 parts of calcium lactate with 140 parts of sodium fumarate with the addition of 50 parts of calcium carbonate and a flavouring agent.

Example II

A dentifrice in the form of a paste is prepared by forming an intimate admixture of the following ingredients:

10% sodium fumarate
    18% calcium lactate
    10% calcium carbonate
    7% water-free glycerin
    2% sodium carboxymethyl cellulose
    52% water
    1% essential oil
    and a trace of saccharine

I claim:

1. A preparation for application to mucus which comprises a substrate of lactic dehydrogenase selected from the class consisting of lactic acid and its derivatives and a substrate of succinic dehydrogenase selected from the class consisting of fumaric acid and its derivatives.

2. A preparation for application to mucus which comprises a lactate and a fumarate.

3. A preparation for application to mucus which comprises calcium lactate and a fumarate.

4. A preparation for application to mucus which comprises calcium lactate and sodium fumarate.

5. A dentifrice which comprises a preparation for application to mucus which comprises a substrate of lactic dehydrogenase selected from the class consisting of lactic acid and its derivatives and a substrate of succinic dehydrogenase selected from the class consisting of fumaric acid and its derivatives together with an abrasive substance.

6. A dentifrice which comprises a preparation for application to mucus which comprises a substrate of lactic dehydrogenase selected from the class consisting of lactic acid and its derivatives and a substrate of succinic dehydrogenase selected from the class consisting of fumaric acid and its derivatives together with calcium carbonate.

7. A dentifrice which comprises a lactate, a fumarate and an abrasive.

8. A dentifrice which comprises calcium lactate, a fumarate and an abrasive.

9. A dentifrice which comprises calcium lactate, sodium fumarate and an abrasive.

ALFRED KRAUS.

REFERENCES CITED

The following references are of record in the file of this patent:

UNITED STATES PATENTS

| Number | Name | Date |
|---|---|---|
| 1,460,179 | Ruthrauff | June 26, 1923 |
| 1,467,024 | Bergve | Sept. 4, 1923 |
| 2,035,267 | Fleischmann | Mar. 24, 1936 |

FOREIGN PATENTS

| Number | Country | Date |
|---|---|---|
| 66,195 | Austria | Aug. 10, 1914 |
| 442,857 | Germany | Apr. 8, 1927 |